(12) United States Patent
Van Vleet et al.

(10) Patent No.: US 7,945,637 B2
(45) Date of Patent: May 17, 2011

(54) SERVER ARCHITECTURE AND METHODS FOR PERSISTENTLY STORING AND SERVING EVENT DATA

(75) Inventors: Taylor N. Van Vleet, Seattle, WA (US); Yu-Shan Fung, Newcastle, WA (US); Ruben Ortega, Seattle, WA (US); Udi Manber, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1445 days.

(21) Appl. No.: 11/325,009

(22) Filed: Jan. 4, 2006

(65) Prior Publication Data

US 2006/0112178 A1 May 25, 2006

Related U.S. Application Data

(62) Division of application No. 10/612,395, filed on Jul. 2, 2003, now Pat. No. 7,565,425.

(51) Int. Cl.
*G06F 15/16* (2006.01)
(52) U.S. Cl. ........ 709/217; 709/203; 709/219; 709/224; 709/229; 707/705; 707/722; 707/728
(58) Field of Classification Search .................. 705/26, 705/27, 1, 37, 14, 80, 57, 53; 715/234, 738, 715/230, 231, 232, 233; 709/203, 229, 217, 709/205, 206, 202, 204, 219, 203.217, 223, 709/224; 455/456.1; 718/102; 707/102, 707/3, 705, 706, 709, 722, 727, 728
See application file for complete search history.

(56) References Cited

U.S. PATENT DOCUMENTS

| | | | |
|---|---|---|---|
| 5,774,123 A | 6/1998 | Matson | |
| 6,310,630 B1 * | 10/2001 | Kulkarni et al. | 715/776 |
| 6,448,980 B1 * | 9/2002 | Kumar et al. | 715/745 |
| 6,453,342 B1 * | 9/2002 | Himmel et al. | 709/213 |
| 6,460,060 B1 * | 10/2002 | Maddalozzo et al. | 715/234 |
| 6,466,970 B1 * | 10/2002 | Lee et al. | 709/217 |
| 6,571,259 B1 * | 5/2003 | Zheng et al. | 707/205 |
| 6,667,751 B1 | 12/2003 | Wynn et al. | |
| 6,785,671 B1 | 8/2004 | Bailey et al. | |

(Continued)

OTHER PUBLICATIONS

UC Berkeley lecture handout titled "Notes 10 for CS 170," dated Feb. 27, 2003, for lecturer David Wagner, downloaded from www.cs. berkeley.edu web site (3 pages).

(Continued)

*Primary Examiner* — Barbara N Burgess
(74) *Attorney, Agent, or Firm* — Knobbe, Martens, Olson & Bear LLP

(57) ABSTRACT

A web site system includes an event history server system that persistently stores event data reflective of events that occur during browsing sessions of web site users, and makes such data available to other applications and services in real time. The server system may, for example, be used to record information about every mouse click of every recognized user, and may also be used to record other types of events such as impressions and mouse-over events. The event data of a particular user may be retrieved from the server system based on event type, event time of occurrence, and various other criteria. In one embodiment, the server system includes a cache layer that caches event data by session ID, and includes a persistent storage layer the persistently stores the event data by user ID. Also disclosed are various application features that may be implemented using the stored event data.

20 Claims, 7 Drawing Sheets

U.S. PATENT DOCUMENTS

| | | | |
|---|---|---|---|
| 6,877,007 B1 | 4/2005 | Hentzel et al. | |
| 6,917,922 B1* | 7/2005 | Bezos et al. | 705/26.81 |
| 7,197,547 B1* | 3/2007 | Miller et al. | 709/223 |
| 2002/0010625 A1 | 1/2002 | Smith et al. | |
| 2002/0013834 A1* | 1/2002 | Esakov et al. | 709/223 |
| 2002/0063735 A1 | 5/2002 | Tamir et al. | |
| 2002/0069407 A1* | 6/2002 | Fagnani et al. | 725/35 |
| 2002/0103789 A1 | 8/2002 | Turnbull et al. | |
| 2002/0143925 A1* | 10/2002 | Pricer et al. | 709/224 |
| 2002/0143933 A1* | 10/2002 | Hind et al. | 709/224 |
| 2002/0178169 A1 | 11/2002 | Nair et al. | |
| 2002/0198882 A1* | 12/2002 | Linden et al. | 707/10 |
| 2003/0110296 A1* | 6/2003 | Kirsch et al. | 709/246 |
| 2003/0188263 A1* | 10/2003 | Bates et al. | 715/513 |
| 2004/0267700 A1* | 12/2004 | Dumais et al. | 707/2 |
| 2005/0102274 A1* | 5/2005 | Chen | 707/3 |
| 2005/0128304 A1* | 6/2005 | Manasseh et al. | 348/207.99 |
| 2006/0004607 A1* | 1/2006 | Marshall et al. | 705/2 |
| 2007/0185850 A1* | 8/2007 | Walters et al. | 707/3 |
| 2008/0177994 A1* | 7/2008 | Mayer | 713/2 |

OTHER PUBLICATIONS

Nanopoulos, A., Manolopoulos, Y., Zakrzewicz, M., and Morzy, T., "*Indexing Web Access-Logs for Pattern Queries*," Proceedings of the Fourth International Workshop on Web Information and Data Management, Kansas City, Missouri, dated Nov. 8, 2002, pp. 63-68.

Joshi, K., Joshi, Anupam, Yesha, Y., and Krishnapuram, R., "*Warehousing and Mining Web Logs*," Proceedings of the Second International Workshop on Web Information and Data Management, Kansas City, Missouri, pp. 63-68 (1999).

Rao, R., Russell, D., and Mackinlay, J., "*System Components for Embedded Information Retrieval from Multiple Disparate Information* Sources," In Proceedings of the 6th Annual ACM Symposium on User Interface Software and Technology, pp. 23-33, ACM Press Nov. 3-5, 1993.

Supplementary European Search Report issued on May 8, 2008 in counterpart European appl. EP 04 75 4909.

Sung Ho Ha, "Helping online customers decide through web personalization," IEEE Intelligent Systems, IEEE Service Center, New York, NY, US, vol. 17, No. 6, dated Nov. 2002, pp. 34-43, XP011095333 ISSN: 1094-7167.

Mobasher, B., et al., "Automatic personalization based on web usage mining," Communications of the Association for Computing Machinery, ACM New York, NY, US, vol. 43, No. 8, dated Aug. 2000, pp. 142-151, XP002210034 ISSN: 0002-0782.

Kiyomitsu, H., et al., "Web reconfiguration by spatio-temporal page personalization rules based on access histories," Applications and the Internet, 2001 Proceedings, 2001 Symposium in San Diego, CA USA, Jan. 8-12, 2001, Los Alamitos, CA USA, IEEE Computer Soc., US, dated Jan. 8, 2001, pp. 75-82, XP010532800, ISBN: 0-7695-0942-8.

English translation of Office Action issued on Aug. 24, 2009 in counterpart Japanese Appl. No. 2006-517214.

Office Action issued on Sep. 10, 2009 in counterpart Canadian Appl. No. 2,530,565.

Office Action issued on Jun. 24, 2010 in counterpart European Appl. No. 04 754 909.2-1225.

* cited by examiner

SERVER ARCHITECTURE AND METHODS FOR PERSISTENTLY STORING AND SERVING EVENT DATA

PRIORITY CLAIM

This application is a division of U.S. patent application Ser. No. 10/612,395, filed Jul. 2, 2003, now U.S. Pat. No. 7,565,425 the disclosure of which is hereby incorporated by reference.

BACKGROUND OF THE INVENTION

1. Field of the Invention

The present invention relates to server architectures for capturing, persistently storing, and serving event data reflective of events that occur during the browsing sessions of web site users. The invention also relates to personalization techniques that make use of event history data.

2. Description of the Related Art

Web site systems commonly include one or more mechanisms for capturing and storing information about the browsing activities or "clickstreams" of users. The captured clickstream data is commonly used to personalize web pages for recognized users. Typically, however, the captured clickstream data either provides only very limited information about each user's browsing history, or is captured in a format that is of only limited use for personalization.

For example, some web sites maintain a real time record of each item selection, browse node selection, and search query submission performed by each user during browsing of an electronic catalog. Such browse histories are useful, for example, for generating personalized item recommendations, and for displaying navigation histories to assist users in returning to previously accessed content. However, these types of records typically lack the level of detail and structure desired for flexibly building new types of real-time personalization applications.

Some systems also maintain web server access logs ("web logs") that contain a chronological record of every HTTP request received by the web site, together with associated timestamp and user ID information. For web pages that are generated dynamically, the web query logs may also record the identities of items presented to users within such pages (commonly referred to as item "impressions"). While these logs typically contain more detailed browse history information, they are maintained in a format that is poorly suited for the real-time extraction and analysis of users' clickstream histories. Although web logs can be mined for information useful to various personalization functions, the task of mining a large web log can take many hours or days, potentially rendering the extracted data stale by the time it is available for use. Further, much of the detailed information contained in a web log is disregarded during the mining process, and is thus effectively lost for purposes of personalization.

SUMMARY OF THE INVENTION

The present invention provides an event history server system that persistently stores event data descriptive of events that occur during browsing sessions of web site users. The event data is stored in association with the IDs of the corresponding users, and is made available in real time to web site applications that may use the event data to personalize web pages for specific users. In one embodiment, the event history server records event data descriptive of substantially every selection event (e.g., mouse click) of every user of a web site. The event history server may also record event data descriptive of other types of browsing events, such as impressions (i.e., items presented to users on dynamically generated web pages) and mouse-over events.

The event data stored for each recorded event is preferably stored within a database as an event object. Each event object may, for example, include identifiers of the general event type (e.g., mouse click, impression, etc.) and type of display element involved (e.g., catalog item, browse node, search result item, etc.), an event value (e.g., the text of a selected URL), a timestamp indicating of the event's date and time of occurrence, and associated context information. A query interface of the event history server enables applications, such as personalization applications, to retrieve a particular user's event data by general event type, type of display element involved, time of occurrence, and possibly other criteria. The query interface also preferably supports queries with the semantics of "has user X accessed URL Y before?" and "when did user X access URL Y?" The query interface may more generally support queries with the semantics of "does an event of type T and value V exist within the event history of user X?"

In one embodiment, the event history server system includes a cache layer that caches event data in association with corresponding browsing session IDs, and includes a persistent storage layer that persistently stores the event data in association with corresponding user IDs. The cache layer preferably includes multiple physical cache layer servers that are partitioned by browsing session ID such that each cache layer server caches the event data of a different respective set of users. The persistent storage layer preferably includes two or more physical storage layer servers, each of which stores a complete set of the persistently stored event data so that any such server can respond to a given query/request for event data.

When a recordable browsing event occurs in a preferred embodiment, an event reporting component sends an update to the cache layer server associated with the particular browsing session ID, which updates its respective cache with the event data specified therein. The updates are also passed from the cache layer servers to the storage layer such that the event data is stored persistently. Queries from clients of the event history server system are initially processed by the cache layer servers, which pass such queries to the persistent storage layer if the relevant event data is not cached.

In one embodiment, the event history server system stores event data descriptive of actions performed by users of a web search application that provides general Internet searching functionality. This event data preferably includes search queries submitted by users, and search result items (URLs) selected by users from search results pages. The recorded event data is preferably used to personalize the search results pages for users. For example, in one embodiment, when a user conducts a search that returns a URL (search result item) that was previously accessed by that user, the search results page is annotated to indicate that the URL was previously accessed, and to indicate a date of such access.

In accordance with one aspect of the invention, the event history server generates user-specific Bloom filters that reflect the URLs that have been accessed by specific users, and uses the Bloom filters to efficiently evaluate whether a particular user has previously accessed a particular URL. Bloom filters may also be generated and used to efficiently evaluate whether other types of events exist within the event histories of specific users, such as item impressions.

Also disclosed are application features for allowing users to view, organize and annotate their respective event histories.

DETAILED DESCRIPTION OF THE PREFERRED EMBODIMENT

A preferred embodiment of a web site system that includes an event history server system will now be described with reference to the drawings. As will be recognized, many of the inventive features embodied within the disclosed system may be implemented or used without others. Numerous implementation details will be set forth in the following description in order to illustrate, but not limit, the invention.

I. Overview

Figure 1:
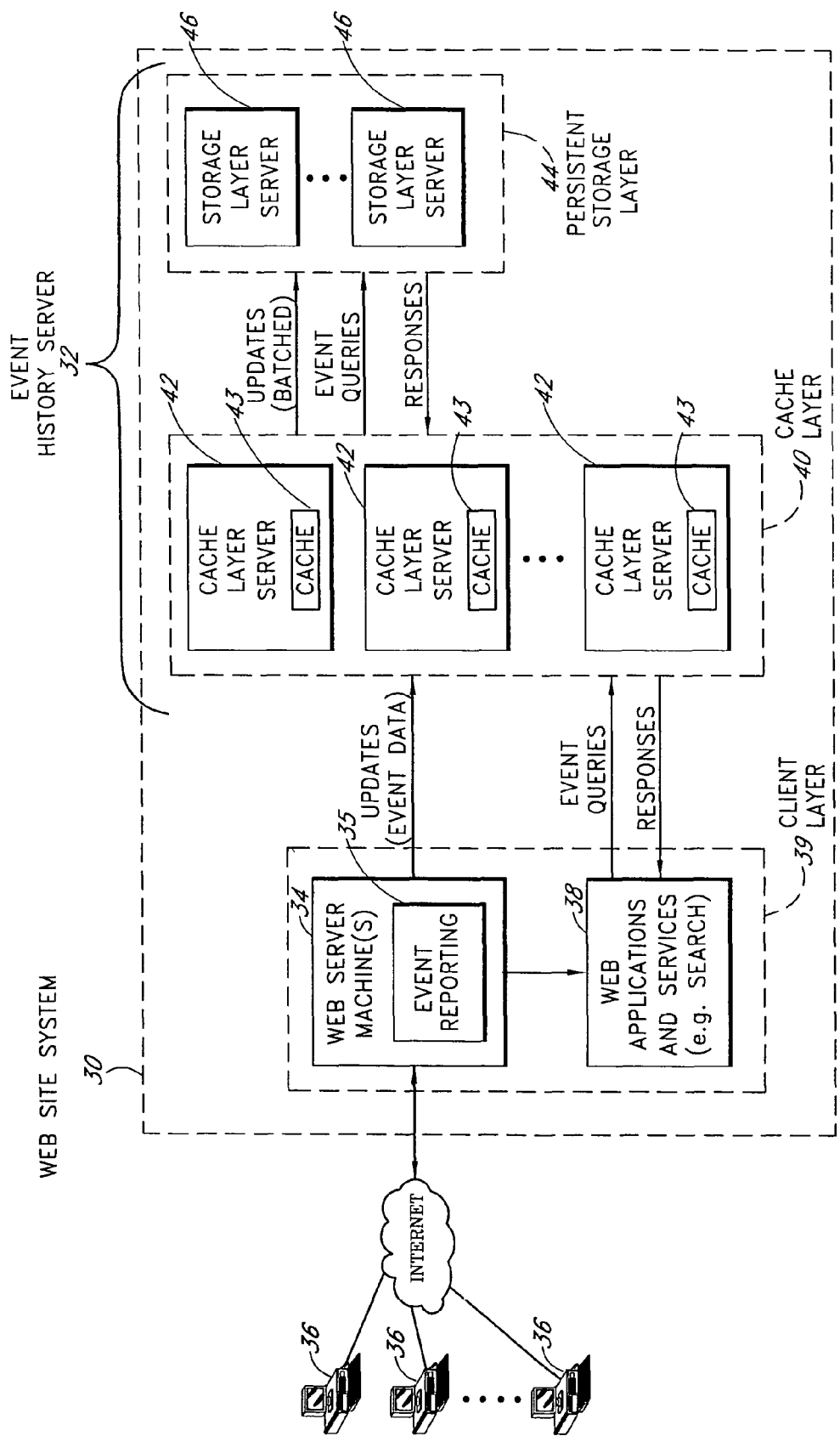
FIG. 1 illustrates a web site system that includes an event history server system according to one embodiment of the invention.

FIG. 1 illustrates a web site system 30 that includes an event history server system 32 ("event history server") according to one embodiment of the invention. The event history server 32 provides a service for persistently recording, and providing real-time access to, event data indicative of events that occur during browsing sessions of users. The event data preferably describes the clickstreams of the users, and may also describe other types of events such as mouse-over and impression events. As described below, the event history server 32 also provides an API (application program interface) through which applications and services can flexibly retrieve, and request information about, the event data of specific users.

As illustrated in FIG. 1, the web site system 30 includes one or more web server machines 34 that receive and process requests from user computers 36 and/or other types of devices (PDAs, mobile phones, etc.). Processes running on the web server machines 34 communicate with various web applications 38, which may be implemented as web services. These applications 38 may run on the web server machines 34, but more typically run on separate server machines (not shown). The types of web applications provided within a given system will typically depend upon the nature and purpose of the system. For example, an Internet search engine site may include one or more search applications 38 for enabling users to conduct keyword searches of an index of web pages. An electronic commerce site may include web applications for performing such tasks as conducting searches of an electronic catalog, browsing an electronic catalog via a browse tree, generating personalized recommendations, placing orders, and managing personal account data. For purposes of this description, it may be assumed that at least some of the web applications 38 supply personalized web page content based on user-specific event data stored by the event history server 32.

As depicted in FIG. 1, each web server machine 34 preferably runs an event reporting component 35 that sends updates to the event history server 32 in response to actions performed by online users. (A given user need not be an individual, but may, for example, be a group of individuals that share a user computer 36 or a user account). Each such update contains or otherwise specifies event data descriptive of a particular event that has occurred during a browsing session of a user, such as a mouse click, a search query submission, or an impression. The event reporting component 35 may include a set of APIs (application program interfaces) for making calls to the event history server 32, and may include configuration parameters specifying the types of actions for which events/updates are to be generated. APIs are also provided for allowing applications 38 to submit queries to the event history server 32. As described in section V below, browsing events may additionally or alternatively be reported to the event history server 32 by a browser-based event reporting component (FIG. 7) that runs on the user computers 36.

The set of data stored by the event history server 32 for a particular event is preferably stored as an "event object." In one embodiment, for example, the event history server 32 persistently stores event objects describing substantially every selection action or "mouse click" of every recognized user of the web site system 30. This information may include, for example, the URL accessed, the time/date of the access, and associated context information. The event history server may also record impression events reflective of specific items presented to users within dynamically generated web pages. For example, when a user views a dynamically-generated web page that includes a personalized list of items selected from a database, the event history server may store an event object for each such item, or may store a single event object that contains the list of items. Additional examples of the types of events that may be recorded, and of the event data that may be recorded for such events, are provided below. The event objects are preferably stored and indexed within the event history server 32 to permit retrieval based on time-of-occurrence, general event type (e.g., mouse click versus impression), type of display element involved (e.g., catalog item, browse node, or Web search result URL), user ID, and other object properties.

The event data captured by the event history server 32 reflects actions performed by users during browsing of a particular web site or set of web sites hosted by the web site system 30. This captured data may, in some embodiments, also reflect actions performed by users during browsing of external, independent web sites. For example, users may be permitted or required to download to their computers 36 a browser plug-in, such as a browser toolbar, that reports all URL accesses (and possibly other types of events) to the event history server 32 (see FIG. 7, discussed below).

Some or all of the web applications 38 preferably act as clients of the event history server 32. As depicted in FIG. 1, the web applications interact with the event history server 32 primarily by sending event queries to the event history server 32 in order to retrieve or obtain information about specific events. Theses queries preferably include requests for fixed-size blocks of event data, such as "recall last N events of type T for user Y," or "recall next N events of type T for user Y." For example, a web application 38 may request the event objects for the last fifty search queries submitted by a particular user, or may request the event objects for the last fifty browse nodes viewed by a particular user. The retrieved event objects may be used by the web applications 38 for any suitable purpose, such as generating personalized item recommendations or displaying browse history data to users to facilitate navigation.

The event history server 32 also preferably supports queries of the semantic form "does an event of type T and value V exist within the event history of user Y?" and "when did an event of type T and value V occur within the event history of user Y?" For example, a web application can query the event history server 32 to find out whether a particular user has accessed a particular URL before, and if so, when. As described below, one application of this feature involves generating a personalized web search results page (see FIG. 3) that highlights the search results/URLs that have already been accessed by the particular user, and indicates when the viewed URLs were last accessed. Additional examples of the types of queries that may be supported by the event history server 32, and of applications which make use of the captured event data, are provided below.

Although the event queries are depicted in FIG. 1 as emanating from the web applications 38, the event history server 32 may also respond to event queries (and possibly updates) from other types of components. For example, a data mining application may retrieve and analyze event data of users for purposes of enhancing browsing of the web site; and a security application or administrator may retrieve clickstream data to analyze a security breach. Application components and services that send updates and/or queries to the event history server 32 are referred to herein as "clients," and are depicted in FIG. 1 as being part of a client layer 39.

As illustrated in FIG. 1, the event history server 32 consists of two layers: a cache layer 40 and a persistent storage layer 44. The cache layer 40 is made up of a set of physical cache layer servers 42, each of which runs service-level software 70 (FIG. 2) for responding to updates and queries from clients. Each cache layer server 42 includes a cache 43 that temporarily stores event data in the form of event objects. The cache 43 may be implemented using non-volatile disk storage, random access memory, or a combination thereof. As described below, the cache 43 may also store user-specific Bloom filters for responding to certain types of queries. Communications between the client layer 39, the cache layer 40 and the persistent storage layer preferably occur over a local area network.

The cache layer servers 42 are preferably partitioned by browsing session ID, meaning that each such server 42 only stores event data (event objects) associated with its respective range or group of session IDs. Thus, for example, when a user starts a new browsing session, that session is assigned to a particular cache layer server 42 which thereafter services all updates and event queries corresponding to that browsing session. In one implementation, a total of nine dual-CPU cache layer servers 42 are provided within the cache layer 40, one of which is used as a hot spare. The caches 43 are preferably implemented as stateless, write-through caches, facilitating the addition, removal, backup, and rebooting of the machines 42.

As described below, the cache layer 40 acts essentially as an intermediary between the client layer 39 and the persistent storage layer 44, allowing the system to operate at higher throughput levels. Although the use of a cache layer 40 is preferred, the event history server 32 may alternatively be implemented without a cache layer. Further, where the cache layer 40 is provided, it may be bypassed where caching would not be beneficial, such that some requests are serviced directly by the persistent storage layer 44.

With further reference to FIG. 1, the persistent storage layer 44 is made up of a set of physical storage layer servers 46. In the illustrated embodiment, two storage layer servers 46 are provided, although a greater or lesser number may be used. Each storage layer server 46 is responsible of maintaining a complete copy of the event data persistently stored by the system 32. Thus, the storage layer servers 46 are mirrors of each other when two or more are provided. Because the storage layer servers 46 are mirrored, a single storage layer server 46 can go down or be taken off line without affecting the overall functionality of the event history service.

Each storage layer server 46 may, for example, include several terabytes of disk drive storage. If approximately 100 M events are recorded per day, and an average of thirty bytes of data are stored for each recorded event, each storage layer server 46 will store approximately 3 GB (gigabytes) of event data per day, or about one terabyte per year. Under such a usage scenario, each storage layer server 46 is capable of storing and serving several years worth of event data. When the storage capacity of a storage layer server 46 is reached, new disk drives may be added to the storage layer to increase its capacity, and/or old event data may be purged or archived.

As described below and depicted in FIG. 2, each storage layer server 46 runs database software 62 for storing and managing the event data, and runs service-level code 60 for processing updates and queries received from the cache layer 40. The storage layer servers 46 may be implemented using low cost commodity hardware, and may use Berkeley databases, or another type of relatively low cost database, to store the event data.

The event history server 32 responds to updates generally as follows. When an update is sent to the cache layer 40 by a web server machine 34, the cache layer server 42 assigned to the corresponding session ID updates its respective cache 43 to include the event object specified by the update. If the event is for a recognized user, the cache layer server 42 also sends the update to each of the storage layer servers 46 (preferably using a publish-subscribe protocol), and each such server 46 stores the associated event object within its persistent storage 64 in association with the corresponding user ID. Each cache layer server 42 preferably aggregates multiple events/updates for sending to the storage layer servers 46, so that these servers 46 receive updates from the cache layer in batches. The event objects are stored in the cache 43 in association with the corresponding session ID and/or user ID.

If the event data specified within an update is for an unrecognized user, the cache layer server 42 stores the event object in its cache 43 (in association with the corresponding session ID), but does not send the update to the persistent storage layer 44. The user may be unrecognized if, for example, the user (1) is new to the web site, (2) is accessing the web site from a particular computer 36 for the first time and has not logged in, or (3) is accessing the web site from a computer 36 that is configured to block cookies and has not logged in. Throughout a session, the cache layer will thus collect event data for an unrecognized user.

If an unrecognized user logs in, creates an account, or otherwise becomes recognized during the browsing session, the associated cache layer server 42 associates collected event data for that user with the user's ID. In addition, the cache layer server 42 sends a series of updates to the storage layer servers 44 to persistently store this collected event data in association with the user ID. The system thus allows a user's events to be persistently captured even though the user may not be recognized at the time such events occur. Further, during the period in which the user is unrecognized, clients of the event history server 32 can retrieve and request information about the cached event data of the unrecognized user based on the user's session ID.

The event history server 32 responds to event queries from clients generally as follows. When a cache layer server 46 receives an event query from a client, it initially checks its respective cache 43 to determine whether the relevant event data resides therein, and responds to the query if the data is present. If the relevant event data does not reside in the cache 43, the query is passed to one of the storage layer servers 46. A load balancing algorithm may be used to select between the storage layer servers 46 for this purpose. The selected storage layer server 46 responds to the query by generating a response (which may include requested event objects), and returning this response to the cache layer server 42 from which the query was received. The cache layer server 42 then passes this response to the requesting client.

If the response includes event data retrieved from persistent storage, the cache layer server 42 stores this event data in its respective cache 43 by default. In the preferred embodiment, an event query may indicate that the retrieved event data should not be cached; this feature may be used, for example, to inhibit caching when a large quantity of event data is read from persistent storage for purposes of off-line data mining.

As indicated by the foregoing, the illustrated embodiment of the event history server 32 captures data descriptive of browsing events as such events occur, and makes such event data available to personalization applications 38 in real time (i.e., substantially immediately). In addition, the event data is made available in a form that allows applications 38 to limit their queries to the specific types and items of event data needed to perform specific personalization tasks. Further, unlike systems that rely on the results of an off-line data mining analysis, the applications 38 have access to the "raw" event data itself, as opposed to merely a summary of such data. Users of the event history server may, in some embodiments, be given the option to control whether their respective browsing histories are to be recorded by the event history server (e.g., an opt-in or opt-out option may be provided). Additional features and benefits of the disclosed architecture are discussed below.

II. Event Object Content and Retrieval

As indicated above, the set of data stored for a given event is stored by the event history server 32 as an event object. In one embodiment, each event object includes the following components: Subject, Value, Tag, and Time. Each of these components is described below. In one embodiment, these components are used to capture data regarding three general types of events: mouse clicks, impressions, and mouse-over events.

The Subject of the event object is a code that indicates, for mouse click, mouse over, and impression events, the type of display element involved (e.g., an item, a browse node, an external URL, or link for submitting a search query). One or more subject codes may also be defined for describing search query submissions from users. The Subject of an event, together with the event's Tag (described below), fully specify the type of the event (e.g., mouse click of browse node, impression of catalog item, etc.).

Table 1 below provides examples of some of the event subjects that may be supported, and indicates the data stored in the Value field for each such event subject. These examples assume that the web site system 30 hosts an electronic catalog that may be browsed and searched by users to locate items (products, new articles, etc.), and also assumes that the web site system 30 implements a search engine for locating external web sites and pages. As will be recognized, the types of events recorded within a particular web site system 30 will depend largely on the nature and purpose of that system, and may vary significantly from those listed in Table 1.

Further, the event types may be varied or extended in order to support additional application features. For example, in one embodiment which is not represented in Table 1, an "annotation" event type is defined for purposes of storing annotations entered by users. One application for annotation events involves allowing users to annotate their respective search results, and to later recall and review such annotations. Users may also be given the ability to publish their annotations to other users. Unlike mouse clicks, impressions, and mouse over events, annotation events represent explicit requests by users to store event data for later retrieval.

TABLE 1

| Event Subject | Description | Value |
| --- | --- | --- |
| Catalog item | User selection, impression, or mouse-over of a catalog item | Item ID |
| Browse node | User selection, impression, or mouse-over of a browse node (item category) | Browse node ID |
| Internal Search query | Search query submission for conducting an internal search, such as a search for items in an electronic catalog | Text of search term(s) entered by user |
| Web search query | Search query submission for conducting a general Web/Internet search that is not limited in scope to any particular set of Web sites | Text of search term(s) entered by user |
| Web search URL | URL selected by user from web search results page. This information may be captured, for example, by initially directing the user's browser to an internal URL used for tracking purposes, and then redirecting the browser to the external URL/web site selected by the user. | Two separate strings are stored, one which contains the text of the URL, and the other of which contains the page's display title. Strings that exceed a particular length are truncated. |
| Feature | User access to a particular web site feature, such as an item recommendations service | Feature ID |
| Other URL | URL access event that does not fall within one of the above categories | Text of URL and associated display title |

The Tag may be implemented as a set of flags indicating some or all of the following: (1) the general type of the event (e.g., mouse click, impression, or mouse-over), (2) whether the Value portion of the event has been truncated (e.g., because of the excessive length of a particular text string), (3) whether the event is "undisplayable," meaning that it cannot be viewed by the user, and (4) whether the event is transient versus persistent.

A Tag's "undisplayable" flag may be used, for example, to allow users to effectively remove events from their viewable event histories. For example, the web site system 30 may provide an application 38 and associated user interface through which users can view and search their respective event histories, and "delete" selected events from such histories. When a user deletes a particular event (such as particular search query submission or browse node access), the corresponding event object is marked by the event history server 32 as "undisplayable" to prevent the user from viewing the associated event, but remains accessible to clients of the event history server 32.

The "transient/persistent" flag may be used to mark those events that can be permanently deleted from persistent storage at a certain point of time. This feature may be used to purge event objects that are of little or no value after a certain time period, so that the associated persistent storage is made available for storing other data.

The Time component is a numerical value indicating the time of occurrence of the event, and may be expressed, for example, in seconds since 1970. When the persistent/transient flag is set to "transient," an additional value may be included specifying the time of expiration of the event object. Expired event objects may be deleted from persistent storage periodically by a background task, or using any other appropriate method.

The query set implemented by the event history server 32 preferably allows clients to retrieve the event objects for a given user or session based on event Subject, Value, Tag, and Time. For example, a client can request the event objects for all impressions (or all mouse click events) of a particular type of display element, or for all impressions (or all mouse click events) of a particular display element type and value. In addition, the query set preferably allows clients to specify an event time range (e.g., "last 10 days," or "since Feb. 10, 2003").

As mentioned above, the query set also supports queries of the following form: "does an event of type T and value V exist within history of user X?" The type of the event may be specified in the query in terms of the general event type (e.g., mouse click or impression), the type of display element involved, or both. For example, a query of the form "does event of type=Web search query and Value=comet Halley exist in history of user X?" would reveal whether user X has conducted a general Web search using the query "comet Halley." Further, the query set supports queries of the type "when did event of type T and value V occur in the history of user X?"

III. Software Architecture

Figure 2:
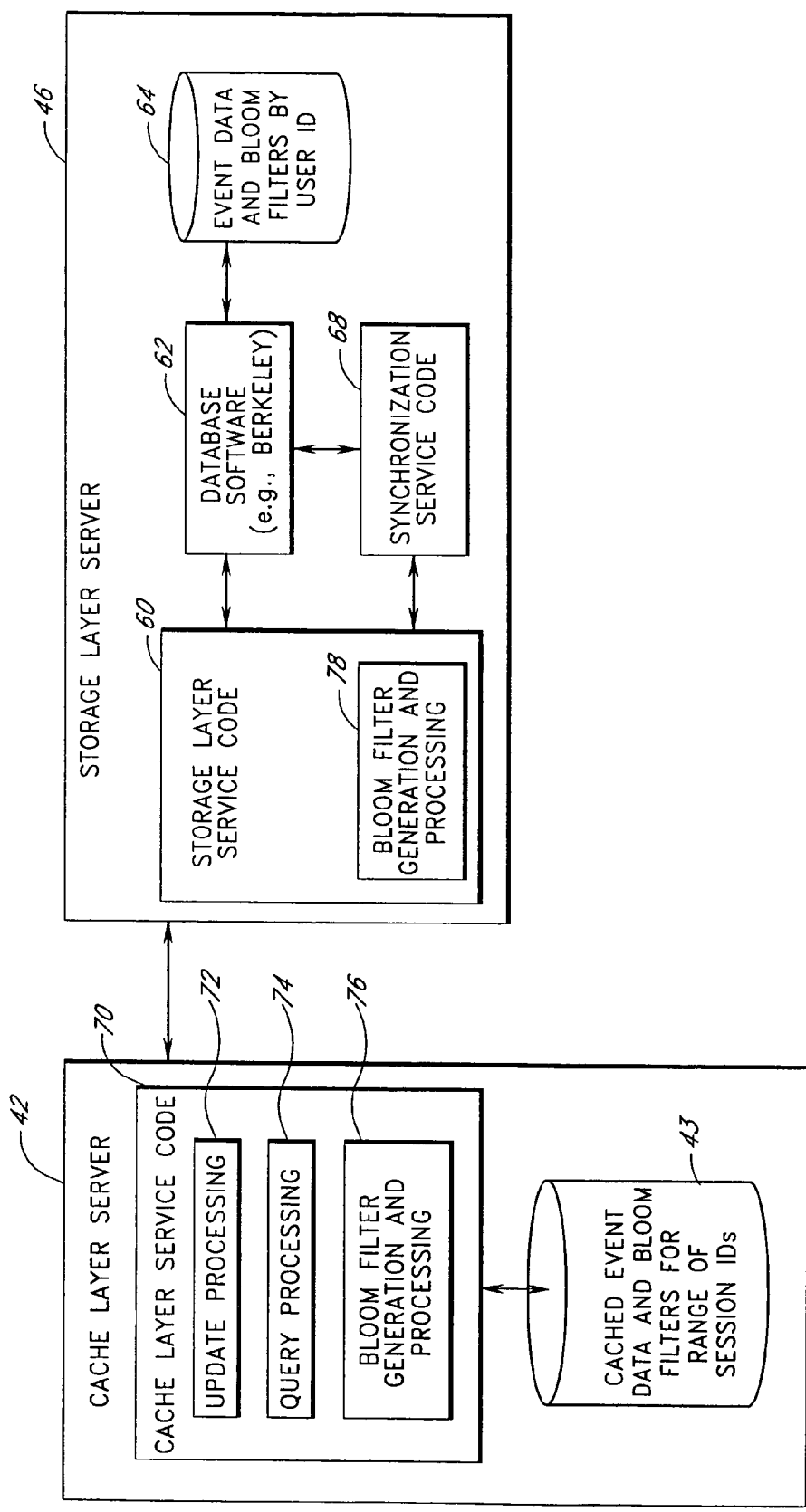
FIG. 2 illustrates a set of software components that may be executed by the cache layer servers and storage layer servers of FIG. 1.

FIG. 2 illustrates the primary software components that run on the cache layer and storage layer servers 42, 46 in one embodiment. As illustrated, each storage layer server 46 runs service code 60 for processing queries and updates from the cache layer 40. The service code communicates with database software 62, such as software used to implement Berkeley databases. The database software 62 manages one or more databases of event data in disk drive storage 64. In one embodiment, each storage layer server 46 runs multiple pub-sub type service processes, each of which corresponds to a respective set or range of user IDs and exclusively accesses its own Berkeley database; this architecture greatly simplifies the management of the databases. Each storage layer server 46 additionally runs synchronization service code 68 that is responsible for maintaining the storage layer servers in synchronization. The synchronization service is used, for example, to synchronize the persistent databases after one storage layer server is temporarily taken off line.

Each cache layer server 42 runs cache layer service code 70 that accesses its respective cache 43 of event data. Event data is preferably stored in the cache 43 both by user ID (if the user is recognized) and session ID. As illustrated in FIG. 2, the cache layer service code 70 includes components 72, 74 for processing updates and queries received from clients.

As further depicted in FIG. 2, both types of servers 42, 46 also preferably include software components for generating and processing Bloom filters. As described below, each Bloom filter is a condensed representation of some portion of a user's event data, and may be used to evaluate whether the user has performed a particular action without having to retrieve the associated event objects. For example, in one embodiment, Bloom filters are used to reduce the processing and data retrieval needed to determine whether a given user has accessed a given URL.

IV. Example Search Personalization Applications

As indicated above, one application of the event history server 32 involves generating a personalized search results page identifying any search result items that were previously accessed by the particular user. The search results page may further indicate the time each such item was accessed. This feature may be applied both to internal catalog searches (in which case the search results page may, for example, indicate those catalog items for which the user has viewed an item detail page), and to web searches (in which case the search results page may indicate which of the external web pages has been viewed).

Figure 3:
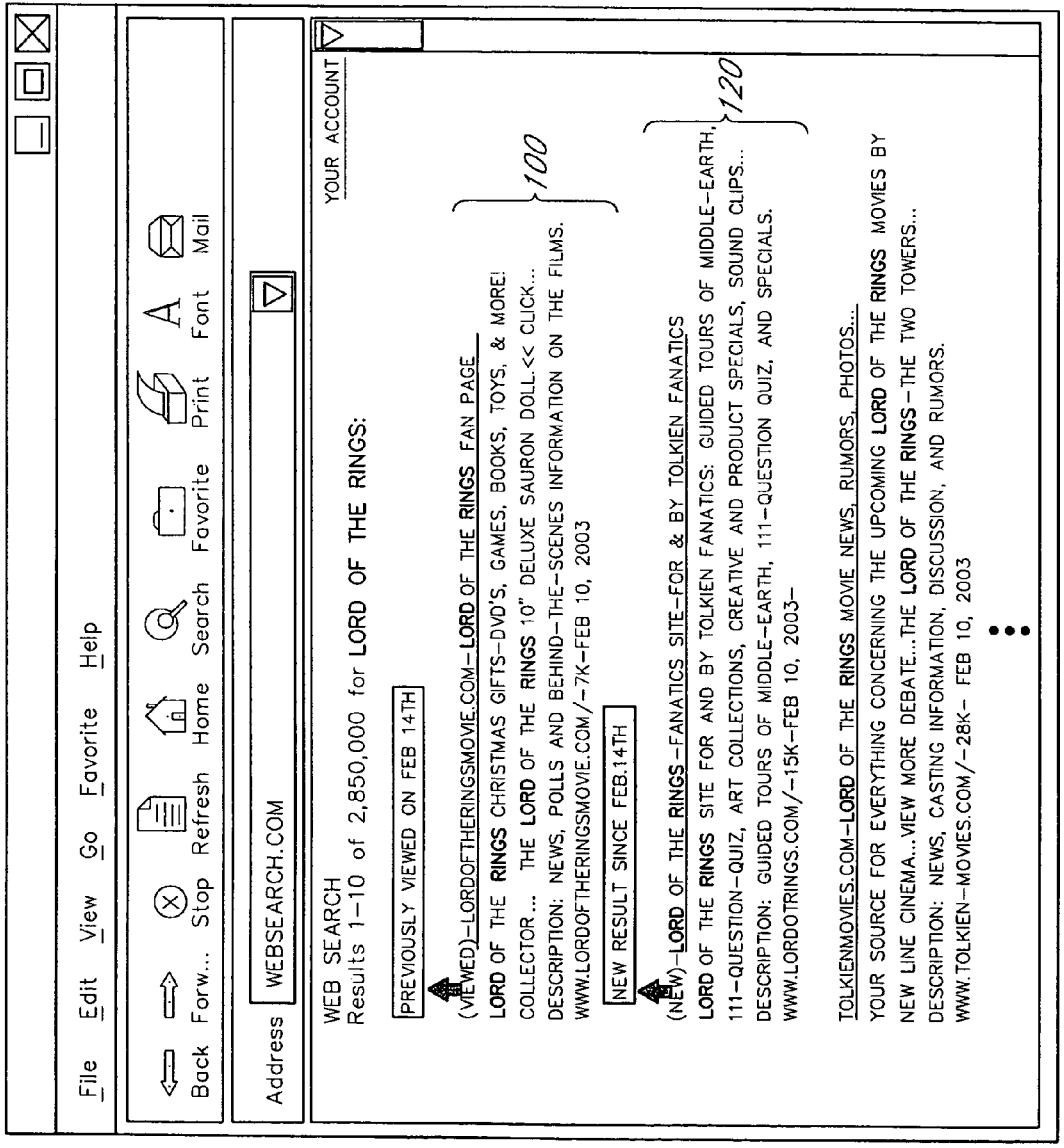
FIG. 3 illustrates an example web search results page in which search results are annotated to indicate the user's prior browsing history with respect to such items.

FIG. 3 illustrates an example web search results page according to one embodiment of this feature. In this example, the web search query "lord of the rings" has produced a search results listing in which each search result item (three shown) is an external web page or site having a corresponding URL. In one embodiment, the links contained within the search result listings are internal links (i.e., they point back to the web server system 30) that are used to immediately redirect the user's browser to the external page of interest; this allows the event history server 32 to record event objects describing the search results (external URLs) selected by the user for viewing. In another embodiment, the user's selections of external URLs are logged by firing a JavaScript component that detects and reports the user's selections.

The first item 100 in the list of FIG. 3 includes the annotation "viewed," indicating that the user previously accessed this particular URL. The user can thus readily identify those web pages that have already been viewed. Because the user's event history is stored on the server side (rather than merely on the user's computer 36), the "viewed" status may be properly indicated even if the user only viewed the particular web page from a different computer 36. By hovering the mouse cursor over this item 100, the user can also view the date he/she last accessed this URL, as shown by the mouse-over text "previously viewed on February 14." The date-of-access text may alternatively be displayed in-line with the search results text 100. Various other types of information can be incorporated into the annotations based on the user's event history, such as the number of times the user has accessed the particular URL, and the text of a prior search query that uncovered this URL (if different from the current search query).

Figure 4:
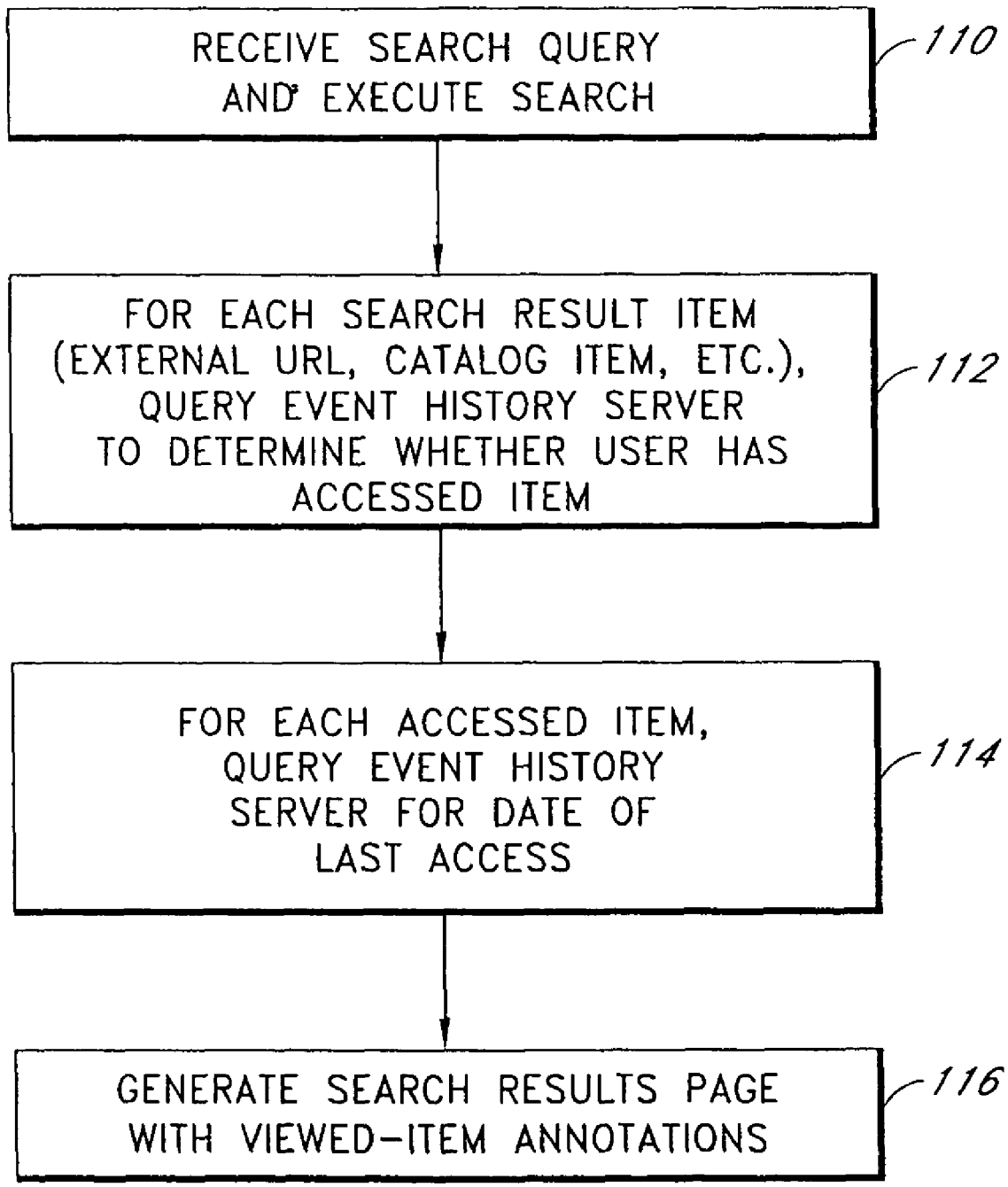
FIG. 4 illustrates a process for identifying search result items that have previously been accessed by the user.

FIG. 4 illustrates the general process by which a search application 38 may interact with the event history server 32 to generate search results pages of the type shown in FIG. 3. It is assumed in this example that the user is recognized by the web site system 30. As depicted by block 110, the search application initially receives a search query, and executes the search to generate a set of search results. If the search is a general web search, each search result item will be in the form of a URL of a web page that is responsive to the search, and may be displayed together with textual excerpts extracted from such web pages (as in FIG. 3). As is known in the art, the execution of such searches typically involves comparing the search query to an index generated by a web crawler program. If the search is directed to an electronic catalog hosted by the web site system 30, each search result item may be in the form of an item description that may be clicked on to access a corresponding item detail page. In some embodiments, the search results returned in a given search may include both external web pages and items selected from an internally-hosted electronic catalog.

As depicted by block 112, the search application then sends a separate query to the event history server 32 for each search result item—or at least those that are to be displayed on the current search result page—to determine whether the user previously accessed that item. For general web searches, each such query may be in the form of "has user X selected URL=<URL value>before?" For catalog searches, each query may be in the form of "has user X selected catalog item=<item ID>before?" As described below, the event history server 32 preferably uses Bloom filters to efficiently process these types of queries, although the use of Bloom filters may alternatively be omitted.

As depicted by block 114, for each search result item found to have been previously accessed by the user (if any), an additional query is preferably sent to the event history server 32 to request the date (time) of the last user's last access to that item. Finally, as depicted in block 116, a search results page is generated with embedded viewed-item annotations of the type shown in FIG. 3. The search application may also take the viewed/not-viewed status of each search result item into consideration in ranking/ordering the search result items for display.

As will be apparent, the process depicted by FIG. 4 can be varied such that the event history server 32 is not actually accessed in response to the search queries. For example, to reduce the load on the event history server 32, the event data indicative of specific search result URLs selected by specific users can be periodically retrieved from the event history server 32 and stored on a separate "search personalization" server. This separate server can then be assigned to the task of responding to requests of the type "has user X accessed external URL Y?" The same is true for the process of FIG. 5, described below.

The search application's user interface may also provide an option for the user to restrict the scope of the search to items previously viewed, items not previously viewed, or items viewed within a particular time period (e.g., the last seven days). This feature may be implemented using the same process flow as in FIG. 4, except that the query results returned by the event history server 32 will be used to determine which search result items are to be displayed.

As will be apparent, the foregoing search results personalization features, as well as those described below with reference to FIG. 5, may also be applied to searches for other types of items. For example, in the context of an online auction site, the results of an auction search may be annotated to indicate which of the located auctions have been viewed by the user, when each auction was viewed, and possibly whether the user has submitted a bid on each such auction. Similarly, the results of a search of bulletin board postings or blog (web log) postings may be annotated to indicate if/when specific postings were viewed by the user.

Referring again to FIG. 3, the second search result item 120 illustrates another feature that may be implemented using the event history server 32. This feature involves determining whether the user previously submitted the same search query, and if so, whether any new search result items (i.e., items not present in the prior search results set) have been found. In this particular example, the search results page reveals that the user previously conducted the same search on February 14, and that the item corresponding to the URL "lordotrings.com" is a new item that did not come up in the prior search.

Figure 5:
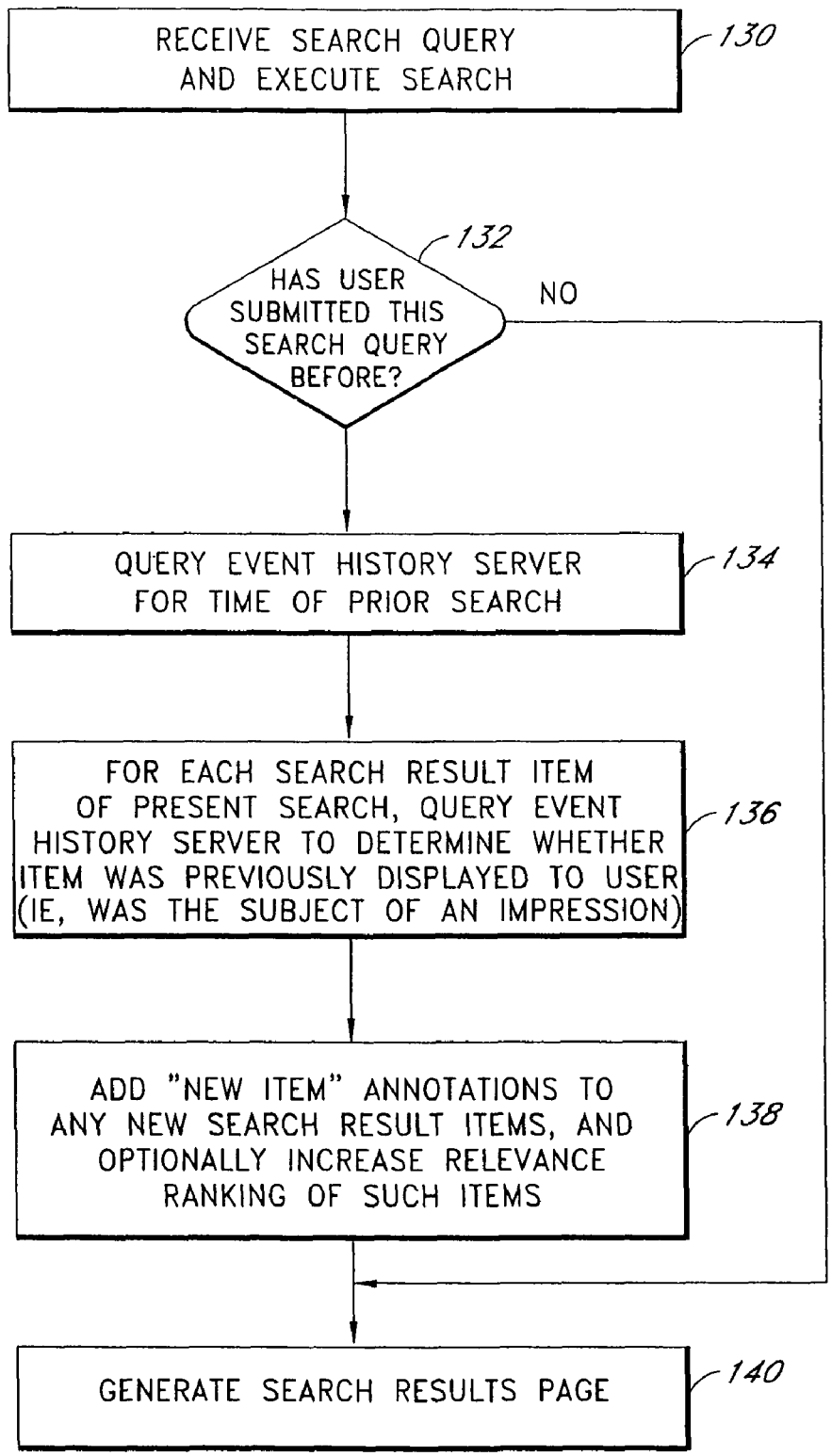
FIG. 5 illustrates a process for determining whether the user previously submitted the same search query, and if so, whether any new search result items have been located in the current search.

FIG. 5 illustrates the general process by which a search application 38 may interact with the event history server 32 to implement this "new-item annotations" feature. This process may be combined with that of FIG. 4 to generate annotated search results pages of the type shown in FIG. 3. As illustrated in FIG. 5, the search application initially receives and executes the search query (block 130), and queries the event history server 32 to determine whether the user has previously submitted the same query (block 132). If the user has not submitted this query, the search results page is generated (block 140) without adding any "new item" annotations.

If the same search query was previously submitted, the event history server 32 is again queried for the time of the last submission (block 134). In addition, as depicted in block 136, the event history server 32 is queried to determine which of the current search result items, if any, have not been displayed to the user (i.e., have not been the subject of an impression event); this query may optionally be limited in scope to impressions occurring at the time of or shortly after the prior search. As depicted by block 138, if any new search result items exist in the current search result set, they are annotated as shown in FIG. 3 (item 120). The relevance rankings of the new items may also be augmented to increase the likelihood that the new items will be displayed.

One variation of the method shown in FIG. 5 is to allow the user to explicitly limit the (repeat) search to items that did not come up in a prior execution of the same search query. This option may, for example, be provided as a check box on the web site's search page.

IV. Use of Bloom Filters to Determine Whether User Previously Viewed or Accessed a Given Element As mentioned above, Bloom filters may be used by the event history server 32 to reduce the need for persistent data retrieval when responding to a query of the form "does event of type T and value V exist in history of user X?" For example, Bloom filters may be used to determine whether a particular user has viewed or selected a particular URL.

By way of background, a Bloom filter is a bit sequence or array generated according to a set of hash functions. Bloom filters are used to quickly test whether a particular item is a member of a large set of items. One common application for Bloom filters is to test whether a given object (as identified by the object's URL) is currently stored in a cache of web pages. Specifically, when an object is added to the cache, the hash functions are applied to the object's URL to determine which of the bits in the Bloom filter are to be turned ON. When an object is requested, these hash functions are again applied to the requested object's URL, and a test is then performed to determine whether all of the corresponding bits in the Bloom filter are turned ON. If one or more of the bits are not ON, the object is not stored in the cache. If, on the other hand, all of the bits are ON, there is a very high likelihood that the requested object is in the cache. Thus, "false positives" or "false hits" are possible, but "false negatives" or "false misses" generally are not.

According to one aspect of the invention, one or more Bloom filters are generated for a given user to describe some aspect or segment of that user's event history. The Bloom filters are preferably generated and stored by the persistent storage layer 44 (FIG. 1), and are passed to the cache layer 40 for purposes of responding to queries. Different Bloom filters may be generated for a given user for responding to different types of queries. For example, different types of Bloom filters may be generated for different types of activity (e.g., URL accesses, URL impressions, URL accesses plus impressions, catalog item accesses, mouse over events, etc.). In addition, different Bloom filters may be generated for different time periods.

Figure 6:
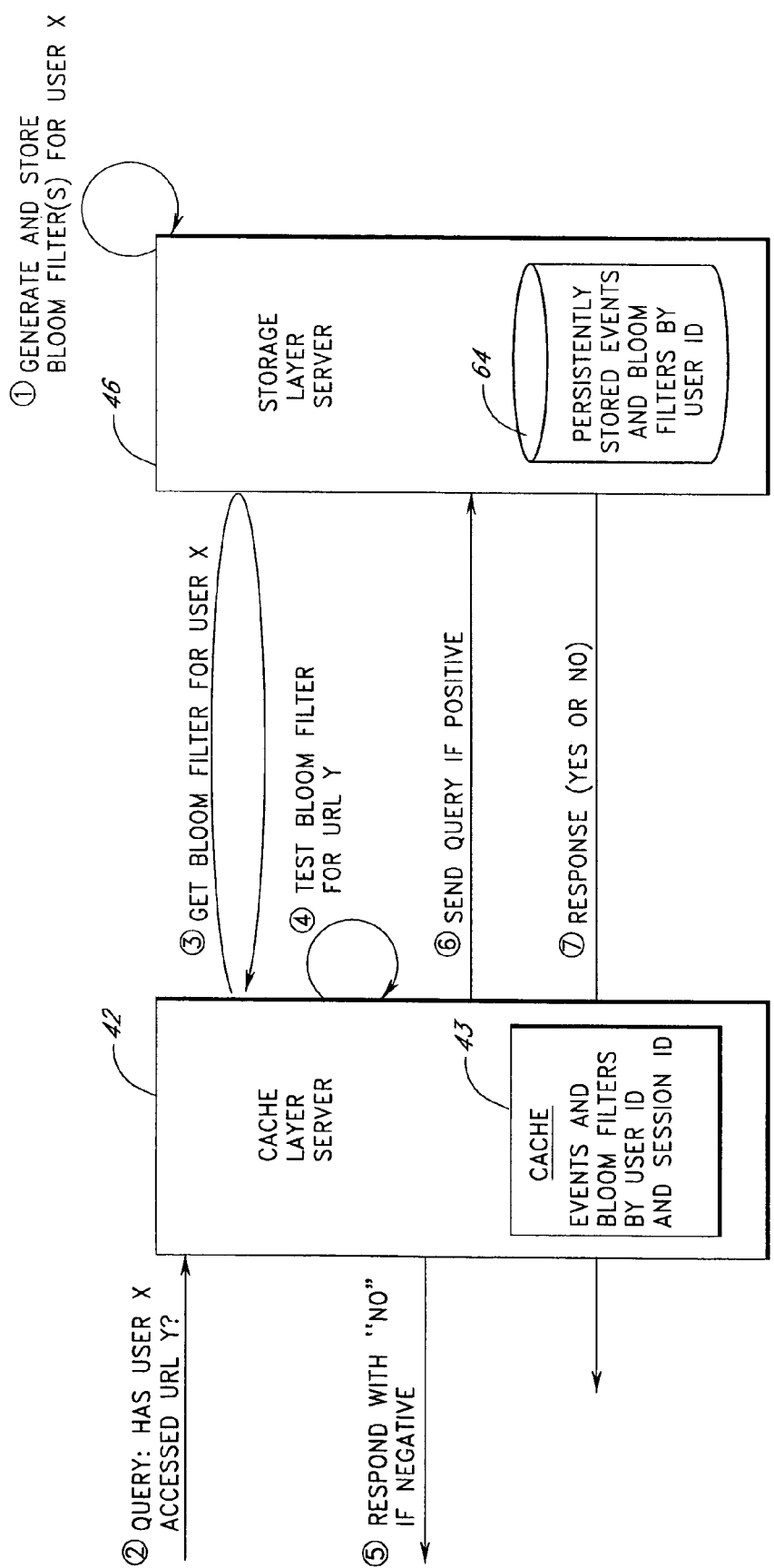
FIG. 6 illustrates the use of a Bloom filter to efficiently determine whether a user has accessed a particular object.

FIG. 6 illustrates the general process by which a Bloom filter may be used to test for URL accesses by a recognized user, User X. Although this diagram is specific to URL accesses, the illustrated process flow also applies to other types of event activity. In step 1 of FIG. 6, a storage layer server 46 generates one or more Bloom filters for User X. This step may, for example, be performed in response to receiving an associated query or update for User X. To generate a Bloom filter specifically for URL accesses, the storage layer service code (FIG. 2) initially retrieves URL access events for User X, applies a set of hash functions to each accessed URL, and sets the associated Bloom filter bits. As discussed below, the size of the Bloom filter may be selected to enable storage of a desired number of events while maintaining a false-positive rate below a desired threshold. Bloom filters generated by one storage layer server 46 may be passed to the other storage layer server(s) by the synchronization service. The bloom filters may additionally or alternatively be generated by the cache layer servers 42.

In step 2 of FIG. 6, a cache layer server receives a query of the form "has User X accessed URL Y?" In the context of the search results annotation features described above, many such queries may be received for a given user for purposes of generating a single search results page. In step 3, the cache layer server 42 retrieves the relevant Bloom filter from one of the storage layer servers 46 if the Bloom filter is not already stored in the cache 43.

In step 4, the cache layer server 42 tests the relevant Bloom filter to see if the corresponding bits for the URL are ON. If one or more of the bits are OFF (meaning that no accesses to URL Y exist in the relevant event history of User X), the cache layer server 42 returns an answer of NO (step 5), without passing the query to the persistent storage layer. If, on the other hand, all of the bits are ON (meaning that the URL access very likely exists within User X's event history), the query is passed to one of the storage layer servers 46 (step 6) to check User X's actual event data for the URL access. In step 7, the storage layer server 46 returns a response to the query via the cache layer server 42. As an alternative to querying the storage layer server (step 6), the cache layer server can be designed to simply return a YES response when the Bloom filter test is positive, although this approach may cause in accurate results to be presented to users on rare occasions.

As updates reflective of URL accesses are thereafter received for User X, the cache layer server 42 (but preferably not the storage layer server 46) updates its copy of the associated Bloom filter to reflect these updates. For example, if User X selects a search result item (URL) from a web search results page of the type shown in FIG. 3, the associated Bloom filter will be updated within the cache 43 to set the bits associated with the selected URL. Thus, the Bloom filter used by the cache layer to respond to queries reflects the most recent browsing activities of the relevant user. At some point, the Bloom filter may be purged from the cache 43 due to inactivity, at which time the updated Bloom filter is written to the persistent storage layer (in place of the original version) for further use.

At some point, a given Bloom filter may reach its capacity, meaning that it cannot store additional events without exceeding a desired average false positive rate. At this point, the Bloom filter may be replaced with a larger Bloom filter (e.g., 8 Kilobytes rather than 4 Kilobytes) in order to provide greater event capacity.

The foregoing description focuses on the generation and use of Bloom filters for recognized users. Bloom filters may also be generated for unrecognized users by the cache layer servers 42. For example, at the outset of a browsing session, the assigned cache layer server 42 may generate a Bloom filter for a user, and may thereafter update the Bloom filter with new events for that user. This "session-specific" Bloom filter may be used to respond to queries in the same way as described above.

V. Browser-Based Reporting of Event Data

Figure 7:
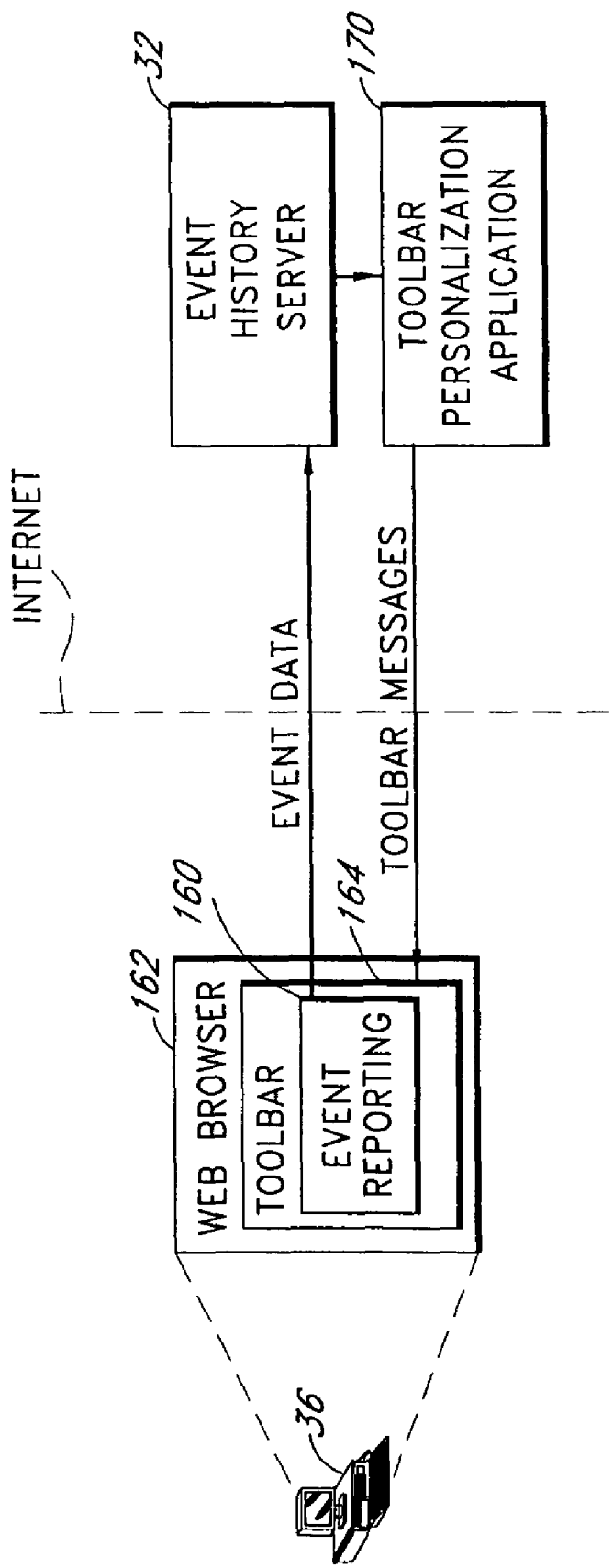
FIG. 7 illustrates how the event history server may be used to collect event data reported by a browser component, such as a browser toolbar.

FIG. 7 illustrates an embodiment in which the event history server 32 records event data reported by a browser-based event reporting component 160. The event reporting component 160 runs as a component of a web browser 162 on some or all of the computers 36 of users of the event history server 32. As illustrated, the event reporting component 160 is preferably implemented as part of a browser toolbar component 164. The toolbar component 164 may, for example, be provided as an optional browser plug-in that can be downloaded and installed by users. The event reporting component 160 may alternatively be implemented as a standalone browser plug-in, as part of a plug-in other than a toolbar, or as part of the native code of the web browser 162.

The browser-based event reporting component 160 preferably reports event data for all web sites and pages accessed by the user. For example, the event reporting component 160 may report every mouse click or other selection event on every web page accessed by the user. The event reporting component 160 may also report other types of browsing events, such as mouse-over events, impressions, selections of the "back" button on the web browser 162, etc.

The browser-based event reporting component 160 may take the place of the server-based event reporting component 35 of FIG. 1. Alternatively, both types of event reporting components 35, 160 may be used within a given system. For example, for users that do not have the toolbar 164 installed, the event history server 32 may only capture data reported by the server-based event reporting component 35, in which case the event data may only reflect events that occur during browsing of one or more specific web sites. For users that have the toolbar 164 installed on their respective computers 36, the captured event data may also extend to other web sites.

The event data collected from the browser-based event reporting component 160 may be used to provide a variety of different personalization services to users. For example, a service may be provided for allowing users to view a listing of all web sites they have respectively accessed that satisfy some user-specified criteria. Using this service, users may, for example, view listings of all payment transactions they have respectively made on the web, or view a history of all travel-related web sites they have accessed. The data fields included within the event objects may be supplemented as needed to implement such a service.

As depicted in FIG. 7, personalized toolbar content may be generated by a server-side toolbar personalization application 170. This application 170 may use event data retrieved from the event history server 32 to generate context-sensitive toolbar messages for display to users. For example, when a user accesses a particular web site, the toolbar personalization application 170 may retrieve and display a history of transactions performed by the user on that web site. Further, the toolbar may be personalized with real time information about all of the web sites or pages visited during the current browsing session.

VI. Other Personalization Applications

As will be recognized, numerous other types of personalization applications and features are made possible by the event history server 32. As mentioned above, one such application involves allowing users to view, organize, and possibly annotate their respective event histories. This may be accomplished in part by providing a user interface, such as a set of web pages, through which users can create event history folders, and select events to add to such folders. An event search engine may also be provided through which users can search their respective event histories by event type, event value, event time-of-occurrence, and various other criteria. As mentioned above, users may also be permitted to "delete" specific events from their respective event histories.

Although this invention has been described in terms of certain preferred embodiments and applications, other embodiments and applications that are apparent to those of ordinary skill in the art, including embodiments which do not provide all of the features and advantages set forth herein, are also within the scope of this invention. Accordingly, the scope of the present invention is intended to be defined only by reference to the appended claims

What is claimed is:

1. A method of processing a search query from a user, said method comprising:
    executing the search query to generate a query result, wherein the query result comprises URLs of web pages that are responsive to the search query;
    for at least one of the URLs, applying a set of hash functions to the URL, and using a result of said set of hash functions to assess whether the URL is included in an event history of the user; and
    when the URL is included in the event history of the user, providing, in a search results page for said search query, an annotation indicating to the user that the URL was previously accessed;
    wherein the method comprises comparing a result of said set of hash functions to a user-specific Bloom filter associated with said user;
    said method performed by execution of program instructions by a server system that comprises computer hardware.

2. The method of claim 1, wherein the annotation further indicates a date that the user accessed the URL, as determined from event data stored on said server system for the user.

3. The method of claim 1, wherein the method comprises querying an event history server separately for each of a plurality of said URLs to determine whether each such URL was previously accessed by the user, said event history server implemented by a set of machines that are separate from a machine that executes the search query.

4. The method of claim 1, further comprising receiving a user-supplied annotation from the user in association with the query result, storing the user-supplied annotation on said server system, and subsequently making the user-supplied annotation available to the user from the server system.

5. The method of claim 1, wherein the method comprises executing the search query on a first machine of the server system, and applying said set of hash functions to the URL on a second machine of the server system.

6. The method of claim 1, wherein the set of hash functions comprises a plurality of hash functions.

7. A method of processing a search query from a user, the method implemented on a server system that is remote from the user, the method comprising:
    executing the search query to generate a query result, wherein the query result comprises URLs of web pages that are responsive to the search query;
    for at least one of the URLs, querying a server to determine whether event data stored for said user indicates that the user previously accessed the URL; and
    if the event data indicates that the user previously accessed the URL, including within a search results page an annotation indicating to the user that the URL was previously accessed;
    wherein the server responds to the querying at least in part by using a Bloom filter stored for the user to evaluate whether the user previously accessed the URL.

8. The method of claim 7, wherein the method further comprises querying said server to identify a date that the user accessed the URL, and including said date within the search results page.

9. The method of claim 7, further comprising, by execution of instructions by said server system prior to execution of said search query, generating said Bloom filter based on a recorded event history of said user.

10. A system that provides functionality for conducting Internet searches, the system comprising:
    a search application that is responsive to search queries from users by generating and returning search results pages listing search result URLs of external web pages that are responsive to such search queries; and
    a server that records user-specific data indicative of the search result URLs selected by users during browsing of the search result pages;
    wherein the search application accesses the server to determine whether specific search result URLs have previously been accessed by a user who is conducting a search, and incorporates into the search results pages indications of which search result URLs were previously accessed, whereby users are notified of search result URLs they have previously accessed;
    wherein the server is configured to generate user-specific Bloom filters that reflect search result URLs selected by users, and to use said user-specific Bloom filters to evaluate whether specific users have previously accessed specific URLs.

11. The system of claim 10, wherein the server additionally records information indicative of the dates that specific search result URLs were accessed by specific users, and the search application uses said information to further indicate within the search results pages the dates that specific search result URLs were accessed.

12. The system of claim 10, wherein the system facilitates tracking of a user's selection of a search result URL by redirecting the user to the search result URL in response to selection thereof 13. The system of claim 10, wherein the server further records user-specific data indicative of specific search queries submitted by specific users, and the search application uses the data stored by the server to identify and highlight search result URLs that did not come up when a user conducting a current search previously conducted the same search.

14. The system of claim 10, wherein the server persistently stores event data for each of a plurality of event types, and implements a query set that provides for real-time retrieval of user-specific event data by event type.

15. The system of claim 10, wherein the server records said user-specific data substantially as corresponding user selections are made of said search result URLs, and makes such user-specific data available to the search application in real time.

16. The system of claim 10, wherein the search application and server collectively provide functionality for users to annotate search results for subsequent viewing.

17. A system that provides functionality for conducting Internet searches, the system comprising:

a search application that is responsive to search queries from users by generating and returning search results pages listing search result URLs of external web pages that are responsive to such search queries; and a server that records user-specific data indicative of the search result URLs selected by users during browsing of the search result pages;

wherein the search application accesses the server to determine whether specific search result URLs have previously been accessed by a user who is conducting a search, and incorporates into the search results pages indications of which search result URLs were previously accessed, whereby users are notified of search result URLs they have previously accessed;

wherein the server comprises a plurality of storage layer server machines that persistently store, and provide real-time access to, event data descriptive of search events that occur during web browsing sessions of users, and comprises a plurality of cache layer server machines that serve as intermediaries between the storage layer server machines and the search application, wherein each cache layer server machine stores cached event data within a respective cache and uses the cached event data to respond to queries from the search application, and wherein the cache layer server machines are partitioned by browse session identifier such that each cache layer server machine caches event data of a different respective set of users.

18. The system of claim 17, wherein each cache layer server machine is programmed to record events of an unrecognized user during a browsing session of the unrecognized user, and is responsive to the unrecognized user becoming recognized by causing the recorded events to be recorded by the storage layer server machines.

19. The system of claim 17, wherein the plurality of storage layer server machines comprises a first storage layer server machine, and comprises a second storage layer server machine that stores a mirrored copy of the event data stored by the first storage layer server machine.

20. A system that provides functionality for conducting Internet searches, the system comprising:

a search application that is responsive to search queries from users by generating and returning search results pages listing search result URLs of external web pages that are responsive to such search queries; and a server that records user-specific data indicative of the search result URLs selected by users during browsing of the search result pages;

wherein the search application accesses the server to determine whether specific search result URLs have previously been accessed by a user who is conducting a search, and incorporates into the search results pages indications of which search result URLs were previously accessed, whereby users are notified of search result URLs they have previously accessed;

wherein the server comprises a plurality of storage layer servers that persistently store, and provide real-time access to, event data descriptive of search events that occur during web browsing sessions of users; and a plurality of cache layer servers that serve as intermediaries between the storage layer servers and the search application, wherein each cache layer server stores cached event data within a respective cache and uses the cached event data to respond to queries from the search application;

wherein the server generates user-specific Bloom filters based on event histories of corresponding users, and uses said Bloom filters to assess whether particular URLs have been accessed by particular users.

* * * * *